July 6, 1965    S. L. RIDGWAY    3,192,918
CHARCOAL STARTING ARRANGEMENT FOR A HOME-STYLE BARBECUE GRILL
Filed Dec. 7, 1960

STUART L. RIDGWAY
INVENTOR.

BY David P. Opler

ATTORNEY

United States Patent Office 3,192,918
Patented July 6, 1965

3,192,918
CHARCOAL STARTING ARRANGEMENT FOR A HOME-STYLE BARBECUE GRILL
Stuart L. Ridgway, 20952 West Canyon Trail,
Topanga, Calif.
Filed Dec. 7, 1960, Ser. No. 74,252
5 Claims. (Cl. 126—25)

This invention is concerned with a charcoal starting arrangement and, more particularly, with an arrangement for controlling a more rapid ignition of the charcoal fuel layer in a home-style barbecue grill.

One of the most popular features of the present day outdoor living is back yard charcoal cooking. Present methods for starting a charcoal fire leave much to be desired because of the effort necessary and the time expended in developing a usable layer of hot coals. When using charcoal, one must expect to consume between twenty and thirty minutes in preparing the fuel layer for use. This problem is sufficiently severe at the present pace of life that even those who relish the flavor of charcoal cooking often forego it when they must complete the meal within a limited time. Prior attempts to expedite charcoal ignition involve the use of electrical starters, various volatile fuels placed directly on the charcoal, or use of fans and blowers. Each of these approaches to the problem has undesirable side side effects such as the contamination of food by volatile fumes, scattering of ashes by fans, and the necessity of rearranging hot coals once ignited. Any time a charcoal fire is rearranged, it loses a portion of its heat, since the most intense combustion takes place at points of optimum juxtaposition between two burning coals such that the air supply to the burning face is adequate and yet such that each hot coal shields (by a radiation exchange process) the other against excessive loss of heat by radiation. Thus if the fire is rearranged, time must pass for new alliances to be established between burning faces. Moreover, with present methods, excess charcoal fuel is required because of the fact that not every coal will be properly ignited to be of full utility in starting the cooking operation. Another disadvantage of present methods of charcoal cooking is the waste of fuel inherent since the fuel is only partially consumed in the complete cooking of a meal. Although drenching of hot coals is suggested to preserve them for later use, it has proved to be rather messy.

Therefore, an object of the present invention is to provide an arrangement for igniting quickly a prearranged fire bed.

Another object is to provide a neat and useful charcoal fire control arrangement.

In accordance with one arrangement of the present invention, the charcoals or briquets are arranged in a uniform layer of a size necessary for the particular cooking operation contemplated. The apparatus of the present invention is then placed over this fuel layer and a starter fuel is arranged around the periphery of the apparatus. The apparatus itself consists of a central chimney and a lower flange which covers the region of the fuel layer. Flames and hot gas developed by the starter fuel at the periphery of the flange are drawn by the chimney from the periphery across the fuel layer into the chimney. Thus substantially all of the starter fuel energy in these flames and hot gases flowing under the flange are in good thermal contact with the charcoal fuel layer. This heat energy ignites the charcoal fuel layer, particularly the top surface. The flange substantially reduces radiative losses from the fuel. With such flame direction and loss reduction, the fuel layer is completely ignited in a period the order of 25% of that normally necessary to prepare a good barbecue fire.

The subject matter which is regarded as the present invention is particularly pointed out and claimed in the concluding portion of this specification. The invention, however, as to its organization and operation, together with further advantages and objects thereof, will best be understood by reference to the following description taken in connection with the accompanying drawing, in which:

Figure 1:
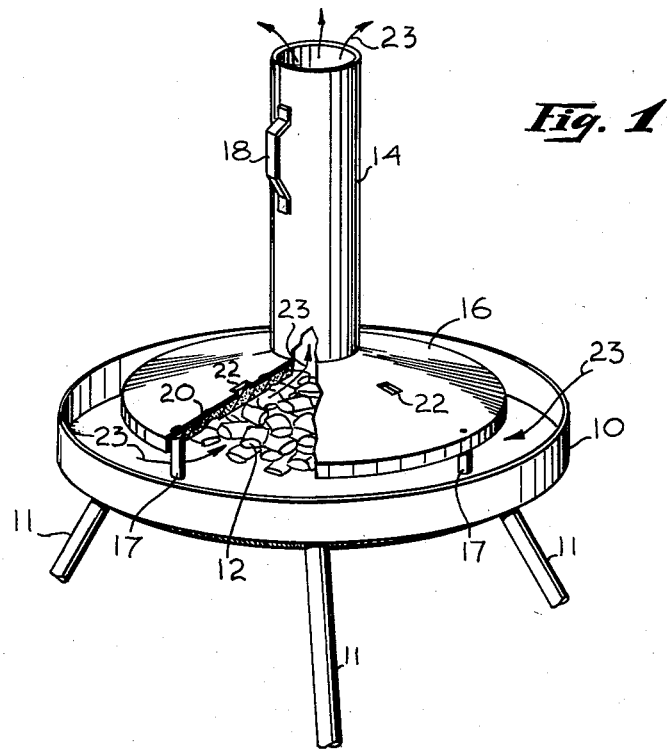
FIG. 1 shows a perspective view, partially cut away, of one embodiment of the present invention used in one environment.

Referring now to the drawing, wherein like numbers refer to similar parts, there is shown in FIG. 1 a fire bowl 10, supported on a plurality of legs 11, so that it is at a convenient height (such as 25 to 30 inches above the ground). Within the fire bowl 10 is arranged a layer of charcoal fuel 12 with the particular charcoal illustrated being the presently popular briquet form. Over the fuel layer 12 is positioned the present invention comprising a central chimney 14, an outwardly extending lower flange 16, and a plurality of legs 17 to support the flange above the fuel layer 12. There is also provided a handle 18 secured to the central chimney 14 for removing the igniting arrangement after its igniting function has been accomplished. Obviously, the handle 18 may be placed on the flange 16 without departing from the true spirit of the present invention.

In a preferred embodiment, a layer 20 of thermal insulation may be secured to the lower surface of the flange 16. This insulation is preferably of a relatively inexpensive, heat resistant material. The insulation 20 may be secured to the flange 16 by any conventional technique. However, a simple method of securing the insulation 20 is to form the flange 16 with a plurality of punched-out, downwardly extending hooks 22 around which the insulation is arranged prior to its being solidified. Examples of suitable insulation materials include castable refractory materials. One specific insulation is marketed as Fibrefrax by the Carborundum Company of Niagara Falls, New York.

Since the more popular fire bowls 10 have diameters of the order of 18 to 24 inches, it is preferred that the flange 16 have a diameter of the order of 18 inches. Empirical investigation of the operation of the present invention indicates that a proper flow (as indicated by the arrows 23) is obtained when the spacing between the outer edge of the flange 16 and the fuel layer 12 thereunder is of the order of ½ to 1½ inches. Since briquets have a thickness of about 1¼ inches, the legs 17 should be approximately 2 inches in length. It is also apparent from the drawing that the particular flange 16, illustrated in FIG. 1, is somewhat conical in shape. The increased depth near the center of the apparatus enhances a good draft over the charcoal layer 12. When the taper is used, it is preferred that it be about one inch so that the hot gas flow velocity over the fuel layer is substantially the same at the outer periphery and near the center. The central chimney 14, when used with an 18 inch diameter flange, should be at least about 3 inches in diameter and is preferably of the order of 4 inches in diameter. In order to develop a substantial draft it is preferred that the central chimney 14 be at least about 12 inches in height.

Figure 2:
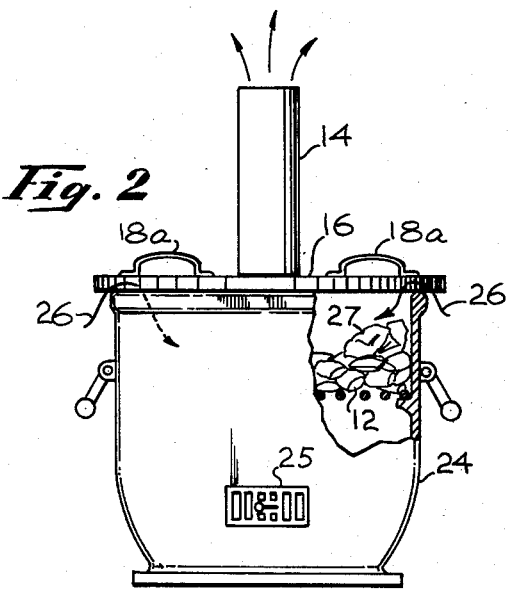
FIG. 2 shows a side plan view, partially cut away, of the invention used in another environment.

Referring now to FIG. 2, the apparatus of the present invention is placed over a hibachi 24 having a small draft aperture 25. The particular hibachi illustrated is square and has dimensions slightly less than the diameter of the present invention whereby the flange 16 rests on the upper surfaces of the side walls of the hibachi but does not completely cover the upper surface opening. Thus air may enter the corners of the hibachi 24 as illustrated by the arrows 26 where a paper 27 or other starter fuel is placed and ignited when it is desired to ignite the charcoal fuel layer 12. In the particular form of the invention shown in FIG. 2, the handles 18a are secured to the flange 16 rather than to the central chimney 14 and the flange 16 is flat.

Figure 3:
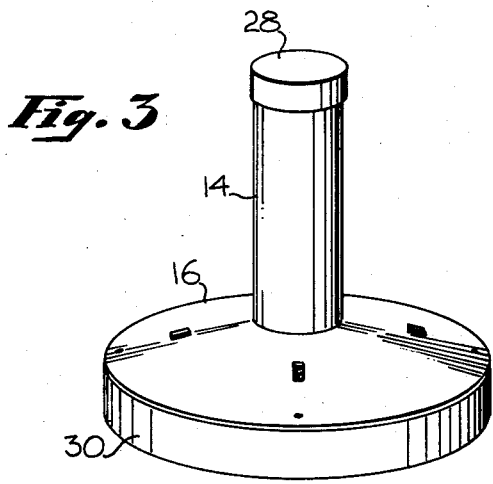
FIG. 3 shows additional elements usable as a part of the present invention.

Referring now to FIG. 3, accessory equipment including a cap 28 and a skirt 30 are illustrated. The cap 28 is placed over the central chimney 14 and the skirt 30 is placed around the periphery of the flange 16 when it is desired to suffocate the ignited charcoal fuel layer 12 and thus preserve the unburned fuel for future use. It is usually advantageous to have suffocated fuel as part of the charge for the next use since it starts more easily than new fuel.

While I have shown and described particular embodiments of the present invention, other modifications may occur to those skilled in the art. It is intended, therefore, by the appended claims to cover all such modifications as come within the true spirit and scope of the present invention.

I claim:

1. In combination with the firebowl of a home-style barebecue grill adapted to contain a relatively flat layer of charcoal on the bottom thereof, a central chimney having an unrestricted flow area of about twelve square inches and a length of about twelve inches to develop substantial draft therethrough; a substantially horizontal outwardly extending flange secured on the lower end of said chimney and having a slightly conical configuration to cover at least a major portion of the layer; and a plurality of legs approximately two inches in length and affixed to the flange about the periphery thereof for supporting said flange on said firebowl about one inch above the top surface of the layer in order to direct the flow of hot flames and gases from the periphery of said flange against the layer.

2. The combination of claim 1 wherein said chimney and said flange are both fabricated of metal and disposed to meet at an included angle of approximately 90°.

3. The combination of claim 1 further including a layer of insulation secured to the lower surface of said flange to reduce heat loss from the charcoal layer during ignition thereof.

4. The combination of claim 3 wherein the dimensions of the chimney and the spacing between the insulation layer and the charcoal are related such that a turbulent flow of hot gases under the insulation layer is maintained to insure thermal contact between the hot gases and the charcoal.

5. The combination of claim 1 further including a handle secured to the chimney.

References Cited by the Examiner
UNITED STATES PATENTS

| | | | |
|---|---|---|---|
| 197,810 | 12/77 | Armstrong et al. | 110—21 |
| 205,465 | 7/78 | Bates | 110—21 |
| 634,609 | 10/99 | Bredemeyer | 110—21 |
| 790,636 | 5/05 | Hubbard | 110—21 |
| 915,239 | 3/09 | Stapp | 126—59.5 |
| 2,702,012 | 2/55 | Weggel | 110—18 |
| 2,786,463 | 3/57 | Vincent | 126—25 |
| 2,894,448 | 7/59 | Henderson et al. | 126—25 |

JAMES W. WESTHAVER, *Primary Examiner.*

PERCY L. PATRICK, *Examiner.*